United States Patent [19]

Whitlock

[11] Patent Number: 5,169,532

[45] Date of Patent: Dec. 8, 1992

[54] METHOD FOR BIOLOGICAL REMOVAL OF CYANIDES, THIOCYANATE AND TOXIC HEAVY METALS FROM HIGHLY ALKALINE ENVIRONMENTS

[75] Inventor: James L. Whitlock, Spearfish, S. Dak.

[73] Assignee: Homestake Mining Company, San Francisco, Calif.

[21] Appl. No.: 726,471

[22] Filed: Jul. 8, 1991

[51] Int. Cl.$^5$ ................................................. C02F 3/34
[52] U.S. Cl. ..................................... 210/611; 210/904
[58] Field of Search ........ 210/610, 611, 904, 615–619, 210/911

[56] References Cited

U.S. PATENT DOCUMENTS

| | | | |
|---|---|---|---|
| 3,617,567 | 11/1971 | Mathre | 210/904 |
| 3,660,278 | 5/1972 | Mimura et al. | 210/611 |
| 3,756,947 | 9/1973 | Fujii et al. | 210/611 |
| 3,816,306 | 6/1974 | Roy | 210/759 |
| 3,940,332 | 2/1976 | Kato et al. | 210/611 |
| 4,188,289 | 2/1980 | Besik | 210/617 |
| 4,199,444 | 4/1980 | Blair et al. | 210/611 |
| 4,440,644 | 4/1984 | Mudder et al. | 210/611 |
| 4,461,834 | 7/1984 | Mudder et al. | 435/253 |

OTHER PUBLICATIONS

Holmes et al. (1977) International Journal of Systematic Bacteriology 27:133–146.

*Primary Examiner*—Thomas Wyse
*Attorney, Agent, or Firm*—Townsend and Townsend

[57] ABSTRACT

Biological treatment process removes free and metal complexed cyanides, and thiocyanate through oxidations. Even high concentrations of these pollutants are workable. Toxic heavy metals are absorbed and adsorbed within a biofilm. This process has been adapted to and performs well at high cyanide concentrations (e.g., even above about 100 mg/L and high pH (e.g., even higher than about 9.5). Mixed cultures of adapted strains of Pseudomonas are utilized to perform biological oxidation within the system. End products of oxidation include carbonates, sulfates, and nitrates. The pH is neutralized by metabolism of, or by, intermediate reaction products. The biological processes can be utilized as a pretreatment or post-treatment process in conjunction with chemical processes.

8 Claims, No Drawings

METHOD FOR BIOLOGICAL REMOVAL OF CYANIDES, THIOCYANATE AND TOXIC HEAVY METALS FROM HIGHLY ALKALINE ENVIRONMENTS

BACKGROUND OF THE INVENTION

1. Field of the Invention

The present invention relates to biological detoxification of drain waters from high pH aqueous environments to remove high concentrations of soluble cyanides, thiocyanates, and toxic heavy metals.

2. Description of Prior Art

Heap leaching, in metallurgical mining terms, involves stacking crushed ore on impermeable liners. A cyanide solution is sprayed over this stockpile and permeates the ore particles. Cyanide causes gold, silver, copper, and other metals to be solubilized. Metals of economic interest are then recovered by conventional separation means.

Wastewaters from the cyanidation process contain high concentrations of free cyanide, metal complex cyanide, ammonia, and thiocyanate. These compounds form by chemical interaction between cyanide and sulfide which are commonly present in metal bearing ores. Cyanidation wastewaters are potentially toxic to aquatic organisms, wildlife, and human beings. Thus, cyanide complexes, heavy metals, and ammonia must be removed before discharge of these wastewaters into surface or ground waters serving as potential potable water sources, or into marine or fresh water habitats.

Several chemical treatment process for removal or detoxification of cyanidation process wastewaters have been employed. Conventional processes utilize ozonation; alkaline chlorination; chlorine dioxide; copper catalyzed hydrogen peroxide; sulfur dioxide/air; acidification, volatization, and reneutralization; evaporation; and sludge impoundment. These methods are limited in their capacity to remove highly concentrated cyanide on an economic basis.

Ozonation oxidizes free cyanides, weakly complexed metal cyanides, and thiocyanate, but fails to oxidize strongly complexed metal cyanides such as ferri- and ferro-cyanide. Ammonia, a by-product of cyanide or thiocyanate oxidation with ozone, is also not oxidized. At high levels, ammonia is toxic to humans and aquatic organisms. Ozone has limited solubility which results in poor treatment performance and a costly process.

Alkaline chlorination processes utilize chlorine compounds, e.g., chlorine gas, hypochlorite, or chlorine dioxide, which remove cyanides and precipitate metals at elevated pH. Iron complexed cyanides, ammonia, and chlorides are not removed. Thiocyanate oxidation may demand excessive chlorine and strict pH control is required for effective metals removal.

Copper catalyzed hydrogen peroxide processes, e.g., those described in U.S. Pat. No. 3,617,567 to Mathre, are becoming the preferred chemical process in the mining industry. These processes remove free and metal complexed cyanides through oxidation, including the ferri- and ferro-cyanides. However, both thiocyanate and ammonia remain. Metals are removed through precipitation. As with ozonation or chlorination, the large volumes of metal hydroxide sludges must be removed from the environment. The added copper catalyst is toxic to aquatic organisms at very low concentration and must be carefully removed before water discharge. Moreover, large amounts of expensive hydrogen peroxide are used, regardless of the cyanide concentration.

International Nickel Company's sulfur dioxide/air oxidation process, which is also copper catalyzed, is similar to other oxidative chemical processes. High sulfate effluent levels and large volumes of metal sludge are process drawbacks.

An acidification, volatilization, and reneutralization process utilizes strong acidic conditions to volatilize cyanides as hydrogen cyanide gas. The gas is trapped with a caustic soda solution. Metals are then concentrated into a hydroxide sludge. At present, the economics of this process are unfavorable in most situations.

Containment of wastewaters followed by evaporation is utilized in some arid areas. Residual sludges must be impounded or treated by other means as toxicity is concentrated from the solution into the sludge formed.

Biological treatment methods have been proposed for aerobic (requiring oxygen) and anaerobic (in the absence of oxygen) destruction of cyanides. The microorganisms Alcaligenes and/or Achromobacter were added to activated sludge to degrade nitriles and cyanides, see U.S. Pat. No. 3,756,947 to Fujii et al. U.S. Pat. No. 3,940,332 was issued to Kato et al. for the use of Nocardia to remove nitriles and cyanides from wastewaters. The genus Pseudomonas has produced species capable of decomposing hydrogen cyanide (U.S. Pat. No. 3,660,278 to Mimura). Multiple stage combinations of chemical and biological treatment systems are disclosed in U.S. Pat. Nos. 3,816,306 to Roy, and U.S. Pat. No. 4,188,289 to Besik.

*Pseudomonas paucimobilis*, see U.S. Pat. No. 4,461,834 to Mudder and Whitlock, is used in a full scale treatment facility as described in U.S. Pat. No. 4,440,644 to Mudder and Whitlock. That biological facility treats low concentration metal complexed cyanide wastewaters at near neutral pH. The bacterial strain *Pseudomonas paucimobilis* is described in Holmes et al. (1977) Int. J. Sys. Bacteriol. 27:133-146.

However, none of these methods provide an effective and economical means for treating heap leach pad wastewaters. These wastewaters are characterized by particularly high cyanide concentrations and high pH. The present invention provides methods and means for economical treatment of these highly polluted waters.

SUMMARY OF THE INVENTION

The biological treatment processes of the present invention remove free and metal complexed cyanides, and thiocyanate through oxidation, even at very high concentrations. Toxic heavy metals are absorbed and adsorbed within a biofilm produced by the biological process. This process has been adapted to and performs well at high cyanide concentrations (e.g., even above 100 mg/L) and high pH (e.g., as high as 10). Mixed cultures containing adapted strains of Pseudomonas are utilized to perform biological oxidation within the system. End products of oxidation include carbonates, sulfates, and nitrates. The pH is neutralized by, or metabolism of, intermediate reaction products. Nitrifying bacteria may also be used to remove ammonia.

The biological processes can be utilized alone or as a pretreatment or post-treatment process in conjunction with chemical processes.

In an exemplary process, treatment according to the present invention is performed by direct application of biomass to a heap leach pad. A more efficient exemplary treatment regime involves flushing contaminated heap leach wastewater from the heap leach pad. This wastewater is then treated biologically in a water treatment apparatus independent of the heap leach pad. Once treated, this biologically active water source can be recycled to further flush the heap leach pad. Active bacterial cells contained within the heap leach pad can continue the treatment. The final treated effluent may be suitable for land application.

Heap leach drainwaters may be of high pH (>10.0) due to agglomeration. Cement is used to clump fine particles into larger composite particles. Fine particles cause "blinding," or block flow through the ground ore. Agglomeration binds the fine particles into larger aggregates and reduces this "blinding" effect. Before biological treatment, phosphoric or sulfuric acid may be used to reduce pH to approximately 9.5–10.0. The optimum pH for the Pseudomonas culture is 7.5. Biological cyanide degradation efficiency decreases as pH increases above 7.5. However, degradation efficiency is still acceptable at a pH as high as 10.

DESCRIPTION OF THE PREFERRED EMBODIMENT

The present invention is a process to biologically detoxify residual wastewaters from high pH aqueous environments, particularly cyanidation heap leach pads.

The environments will usually also contain high concentrations of cyanide and other toxic substances. High pH and high cyanide concentrations are defined hereinafter with specific reference to the exemplary heap leach environments.

Cyanide extraction of crushed ores extracts gold, silver, copper, and other metals from the heap leach pads. Once precious metals are extracted from heaped ores by cyanide dissolution the wastewaters from the spent pad pose a long term environmental threat. These wastewaters typically have high concentrations of free cyanides, metal complex cyanide, ammonia, and thiocyanate. The biological processes of the present invention provide low cost, efficient, and long term solutions to remediate this environmental threat. Treatment by the biological processes described herein equals or exceeds the performance of known chemical treatment processes. Biological sludge production is an order of magnitude less than chemical sludge volumes produced by chemical processes. The resulting biological sludges have long term activity or remedial capacity and nutrient value in the environment, in contrast to chemical sludges.

According to the present invention, organisms of the genus Pseudomonas are used to remediate the wastewaters. These organisms are adapted to tolerate, degrade, and detoxify free cyanides, metal complexed cyanides, thiocyanates, and heavy metals of moderate to high concentration. The wastewaters present an extremely hostile growth environment to the organisms, combining high levels of toxic compounds with a high pH. The aerobic biological populations consist of mixed cultures of species of Pseudomonas. The species used and relative populations of each species will depend upon process conditions and site-specificity. However species exposed to high cyanide concentrations will require high resistance to retain viability. This resistance is selected through controlled adaptation.

The heap leach wastewaters normally have high cyanide concentrations. Thus, the cultures used herein will be tolerant to cyanide levels of at least about 25 mg/L, normally at least about 45 mg/L, typically at least about 65 mg/L, and usually at least about 85 mg/L. The cyanide will be in the forms of free cyanide and metal complexed cyanide. These will be found in compounds, e.g., iron cyanide, copper cyanide, and free hydrogen cyanide.

Additional compounds to which tolerance is particularly important include ammonia, thiocyanate, arsenic, and heavy metals, e.g., copper, mercury, lead, and cadmium.

In addition to high cyanide concentrations, the heap leach wastewaters are often also very alkaline or basic, so the cultures must also be tolerant to conditions of elevated pH. The strains will normally be tolerant to a pH of at least about 7.5, typically of at least about 8.5, and usually of at least about 9.5.

To achieve required toxic compound tolerances, the cultures are subjected to selection. Genetic br developmental variants are selected for those which are naturally tolerant to those conditions. Pseudomonas cultures, such as *P. aeruginosa,* selected for cyanide acclimation studies are maintained in a liquid growth media consisting of metal complexed cyanides, e.g., at a concentration of about 15 mg/L, with thiocyanate and toxic heavy metals, e.g., at concentrations of about 120 mg/L and 4–6 mg/L respectively. The growth medium also contains nutrient inorganic salts as required for culture maintenance. The selection process is performed under a series of conditions of increased stringency to arrive at the desired tolerances.

As cyanide ($CN^-$) is degraded biologically, ammonia is produced. Toxic concentrations of cyanide may be expected to produce toxic concentrations of ammonia during degradative processes. Ammonia tolerant strains can be selected, or nitrifying bacteria in mixed culture are utilized to convert ammonia to nitrate. Exemplary nitrifying bacteria include Nitrobacter, Nitrosomonas, and others.

The end products of biological detoxification, e.g., degradation, of cyanides and thiocyanates include environmentally compatible compounds of bicarbonate, sulfate, and nitrate.

The microorganisms are contacted with the wastewaters in an appropriate manner for a sufficient period of time to achieve satisfactory detoxification. This time period will normally be at least about a quarter hour, typically at least about a half hour, usually at least about one hour, and preferably at least about two hours. To optimize capacity, shorter time periods will often be used, though longer times may provide greater efficiency.

Conventional biological digestion processes and hardware will be useful with these microorganisms. Conventional processes and equipment are described, e.g., in U.S. Pat. No. 4,461,834, which is incorporated herein by reference. The biomass may be utilized, e.g., as a suspended or attached growth system. Activated sludge systems utilize organisms suspended in solution. Rotating biological contactors (RBC's), trickling filters, and bio-towers utilize plastic, metal, ceramic, or natural media, e.g., river rock, to promote attached growth of biomass. In either system, the biological treatment is affected by mixed cultures which grow together as an aerobic flora which contacts the waters. Preferably, the dissolved organic matter in the water provides the nutrients for growth of the flora. The present invention provides aerobic mixed flora which metabolize the cyanides and thiocyanates to environmentally acceptable byproducts, e.g., nitrates and sulfates.

A common method of biological treatment makes use of an activated sludge. This is a biologically active sediment produced by the repeated aeration and settling of sewage and/or organic wastes. The activated sludge comprises a mixture of bacteria, protozoa, and miscellaneous other forms of life. The types and numbers of the various organisms will vary with the types of nutrients present in the sludge and with the length of the aeration. The organisms within the activated sludge metabolize the polluting organic matter within the sludge and leave environmentally acceptable metabolites.

The activated sludge process typically involves aeration of suspended biological solids in a solution. Aeration is often achieved through submerged porous diffusers or by mechanical surface agitation. Typically, an aeration period of two to six hours is followed by a one to two hour period with no aeration to allow the solids to settle. These solids, which comprise the solids in the suspension together with the biological growth, are maintained in the aeration tanks to provide seed for continued biological treatment. Suspended solids are maintained at 1000 to 3000 mg/L by appropriate solids removal at appropriate times. The removed solids are preferably non-toxic.

An alternative process for biological remediation uses attached growth processes. Attached growth processes in rotating biological contactors (RBC's), trickling filters, or bio-towers appear to perform better than activated sludge systems in treating waters with high cyanide and metals concentrations. Therefore, packed columns, e.g., a biofilter and a pilot scale RBC were selected test designs. See, e.g., Clark, J. W., Viessman, W., and Hammer, M. J. (1977) *Water Supply and Pollution Control* (3d Ed.) Harper and Row, New York, for general description of these attached growth apparatuses.

The design and manufacture of biofilters and rotating biological contactors is well established. Standard references describing the parameters of interest and design of both processes and apparatus include, e.g., Clark, et al. (1977) *Water Supply and Pollution Control* which is incorporated herein by reference. Loading rates are based on biological oxidation demand (BOD) figures. Research data on sewage treatment is often relevant. Wastewater retention times are normally several hours with hydraulic loading rates based on gallons/day/ft$^2$ and mass load rates of pounds/day/ft$^2$. The present system should sustain mass loading rates of at least about 5-10 gpdft$^2$ with 50 mg/L total oxanide.

Rotating biological contactors are generally electrically or air driven plastic media disks of high surface area, e.g., 100,000-150,000 ft$^2$. These disks revolve at 0.5-1.5 revolutions per minute with the disk about 40% submerged in the wastewater. Supplemental air, e.g., high volume/low pressure, will often be added to support attachment of aerobic biomass.

Mixed cultures of Pseudomonas species are adapted to decreasing dilutions of wastewater from an operational heap leach pad. This acclimation period lasts 4–6 weeks and results in a maintenance culture established at 60-70 mg/L total cyanide concentration.

The biota selected at the Wood Gulch site was developed by utilizing existing biomass from the Homestake Wastewater Treatment Plant in Lead, S.D. This biomass was subjected to wastewater from Wood Gulch at about pH 9.5, at a temperature of about 60° F. Alkalinity was controlled at about 180 mg/L and phosphorus as Pi at about 0.8 mg/L. This selection continued for about 7 weeks. The resulting surviving biomass appears to be primarily Pseudomonas species, though identification has not yet been completed. This acclimated culture serves as a "seed" source for subsequent testing.

The methods described herein may be used by themselves in a treatment process, or may be combined with other treatment methods, e.g., as a pre-treatment or post-treatment step. Different stages of the process may be combined, each stage containing a microorganism population selected for specific remediation of different toxic compounds.

EXPERIMENTAL RESULTS

Wastewater tested consisted of drainwaters from a cyanidation process heap leach pad. Also, cyanide contaminated samples of ore from the leach pad were subjected to biological detoxification. Agglomeration, i.e., mixing cement products with fine ore particles to increase particle size, was utilized in the heap leach stockpile design. The pH of the drainwater was above pH 11.

Contaminants in the wastewater and bound to the ore particles included metal complexed cyanides, free cyanides, and thiocyanates.

Pilot testing of biological wastewater treatment processes consisted of attached growth to plastic media. Packed columns represented the biofilter concept and a 2.0 meter pilot scale RBC represented the stationary contactor concept. Contaminated ore in columns was directly seeded with biological cultures to represent in-situ treatment of wastewaters within the leached stockpile.

Parameters selected for analysis were total cyanide, weak acid dissociable (WAD) cyanides, thiocyanate, ammonia, heavy metals, hardness, alkalinity, and pH. Total cyanide is the total of all metal complexed cyanides, hydrogen cyanide, and sodium cyanide. this is measured by standard ASTM methods, measuring total cyanides after distillation. See, EPA (1983) *Methods for Chemical Analysis of Water and Wastes.* Weak acid dissociable cyanides are metal complexed cyanides, e.g., copper, zinc, nickel cyanides, and hydrogen and sodium cyanide. The WAD cyanides are measured by ASTM methods. Thiocyanates are sulpher bound cyanide (SGN) and are measured by the ferric nitrate method (ASTM).

Ammonia levels are typically measured by use of an ion selective electrode (ASTM). Heavy metals, e.g., copper, nickel, zinc, cobalt, cadmium, and chromium are measured by atomic absorption methods (ASTM).

Hardness is the sum of calcium and magnesium concentrations, both expressed as $CaCO_3$ and $MgCo_2$, in mg/L. They are both measured together using an EDTA titration method (ASTM). Alkalinity is a measure of the water capacity to absorb hydrogen ions without significant pH change (neutralization or buffering capacity) and is measured according to standardized sulfuric acid addition.

Analysis was in accordance with *Methods for Chemical Analysis of Water and Wastes:* EPA-600 4-79-020, 1983, NTI Springfield, Va. 22161; and *Standard Methods for the Examination of Water and Wastewater:* 17th Edition, 1989, American Public Health Association, Washington, D.C. 20005, each of which is hereby incorporated herein by reference.

EXPERIMENT 1

A trickling filter design was tested. Plexiglass columns of 6 inch diameter and 10 foot length were packed with contaminated ore or plastic pall rings. Ore particles were ¼-¾ inch size and loosely packed in the columns. Pall rings were Norton (Houston, Tex.) brand ⅝ inch plastic pall rings; 104 sq. ft. surface area per cubic foot volume. Hydraulic load rates to the packed columns were 1 to 3 gallons per day/ft² surface area.

A battery of five columns was used in the pilot test design. Column function was as follows:

Column 1: Cyanide contaminated ore was packed in the column to a depth of nine feet. Biological growth from the mixed species of Pseudomonas culture was seeded to a depth of ⅜ inch on the upper surface of the ore media. Contaminated drain water was passed through the column at a flow rate of 4.0 ml/minute. Characterization of wastewater from the heap leach pad is given in Table 1.

TABLE 1

WASTEWATER CHARACTERIZATION
CONCENTRATION IN mg/L

| Total CN | 101.3 | WAD CN* | 73.4 |
|---|---|---|---|
| Thiocyanate | 15.8 | Ammonia-N | 24.5 |
| Nitrite | 3.88 | Nitrate | 7.0 |
| Sulfate | 160.0 | Phosphorus | 1.4 |
| pH | 11.8 | Alkalinity-Total | 406.0 |
| Hardness | 140.0 | Mercury | 0.05 |
| Copper | 6.46 | Gold | 0.10 |
| Iron | 2.83 | Lead | 0.04 |
| Zinc | 0.21 | Cadmium | 0.01 |
| Nickel | 0.80 | Chromium | 0.60 |
| Silver | 1.9 | Arsenic | 1.1 |

*WAD Cyanide is analyzed as Weak Acid Dissociable Cyanide, measured according to ASTM standards Column 2: Cyanide contaminated ore was packed in the column to a depth of nine feet. No biological seed was added to the column. The hydraulic feed was 4.0 ml/minute or a hydraulic loading rate of 1.5 g/day/ft². The effluent from column 2 becomes the feed source for column 4.

Column 3: ⅝" plastic pall rings form the packing for this column. Column packing is seeded with a mixture culture of Pseudomonas which is given 2 weeks before the beginning of this test to attach to the plastic media. The feed water source is the effluent from column 5.

Column 4: ⅝" plastic pall rings form the packing for this column. The column packing is seeded biologically as in column 3. The feed water source for column 4 is the effluent from column 2.

Column 5: Cyanide contaminated ore is packed and treated as in column number 2. No biological seed is added. The effluent from this column becomes the feed to column 3.

Flow to column 5 was initiated on day 1. Raw feed water was full strength wastewater from an operational heap leach pad. Wastewater was fed at full strength for 14 days.

At day 14 in the 45 day test, the raw feed water was diluted 12:1 with a water of similar matrix without cyanide and with much reduced heavy metals concentrations. This make-up water dilution step represents the use of treated water to further flush the heap leach pad.

The effluent from column 5, (the influent for column 3), had pH adjustment from 9.3 to 8.8. Dilute sulfuric acid was used to lower the pH to determine if treatment performance would improve at slightly reduced pH.

The results are presented in Table 2. Data indicate the performance of column 3 to be superior to other test columns. Column 3 represents drain waters from the heap leach pad with pH adjustment before conventional trickling filter treatment utilizing a mixture of Pseudomonas species acclimated to cyanide. Greater than 96% of total and WAD cyanide species were degraded or removed and 88% of copper present was removed. It is anticipated that under continuous operation on a full scale, biomass would increase and metals removal would also improve.

TABLE 2

SUMMARY OF TREATMENT PERFORMANCE
FOR COLUMNS 1, 3, AND 4
Data Represents Average Values Over 45 Day Test Period

| | Influent Concentration mg/L | Effluent Concentration mg/L | % Removal |
|---|---|---|---|
| Column 1 | | | |
| Prior to Dilution | | | |
| Thiocyanate | 10.5 | 8.0 | 14.0 |
| Total Cyanide | 130.0 | 74.5 | 43.0 |
| WAD Cyanide* | 124.5 | 63.3 | 49.0 |
| Copper | 6.3 | 5.8 | 8.0 |
| Ammonia-N | 28.6 | 17.5 | 39.0 |
| After Dilution | | | |
| Thiocyanate | 4.5 | 0.8 | 82.0 |
| Total Cyanide | 13.9 | 1.2 | 91.0 |
| WAD Cyanide* | 11.8 | 0.25 | 98.0 |
| Copper | 0.8 | 0.08 | 90.0 |
| Ammonia-N | 3.5 | 3.0 | 14.0 |
| Column 3 | | | |
| Prior to Dilution | | | |
| Thiocyanate | 12.2 | 1.9 | 84.0 |
| Total Cyanide | 64.6 | 2.4 | 96.0 |
| WAD Cyanide* | 58.7 | 1.9 | 97.0 |
| Copper | 5.5 | 1.8 | 67.0 |
| Ammonia-N | 10.0 | 8.0 | 20.0 |
| After Dilution | | | |
| Thiocyanate | 5.5 | <0.5 | 91.0 |
| Total Cyanide | 8.3 | 0.16 | 98.0 |
| WAD Cyanide* | 5.0 | 0.03 | 99.0 |
| Copper | 0.5 | 0.06 | 88.0 |
| Ammonia-N | 8.0 | <0.5 | 94.0 |
| Column 4 | | | |
| Prior to Dilution | | | |
| Thiocyanate | 13.0 | 6.3 | 51.0 |
| Total Cyanide | 75.8 | 5.2 | 93.0 |
| WAD Cyanide* | 68.3 | 4.7 | 93.0 |
| Copper | 4.9 | 1.9 | 61.0 |
| Ammonia-N | 16.4 | 10.3 | 37.0 |
| After Dilution | | | |
| Thiocyanate | 3.0 | 1.0 | 67.0 |
| Total Cyanide | 12.1 | 1.2 | 90.0 |
| WAD Cyanide* | 10.2 | 0.25 | 97.0 |
| Copper | 0.6 | 0.22 | 63.0 |
| Ammonia-N | 6.1 | <0.5 | 92.0 |

*WAD Cyanide is analyzed as Weak Acid Dissociable Cyanide, measured according to ASTM standards.

Conversion of ammonia to nitrate was significant. Experience indicates that staging of reactors allows nitrifying bacteria to proliferate in the absence of cyanide thereby improving nitrification efficiencies.

Column 4 performed well, however, the slight improvement in treatment efficiency in column 3 is likely related to operation at decreased pH. Column 1 performance indicates that treatment can be implemented by biological seeding of the ore stockpile. A small column is well oxygenated and may not fully represent a large ore stockpile depleted of oxygen within. It is expected that direct stockpile treatment will be advantageous.

EXPERIMENT 2

Phase 2 of the testing program involved the use of a 2.0 meter Rotating Biological Contactor (RBC).

The 2.0 meter RBC test unit consists of 4 separate compartments each with a total surface area of about 2000 ft$^2$, i.e., a total disk surface area of about 8000 ft$^2$. The hydraulic flow rate was set at 1.5 gallons per minute, providing hydraulic loading rate of 0.27 g/day ft$^2$.

Before introduction of raw wastewater feed, biomass growth was established on the disk and acclimated to a water source containing 35 mg/L total cyanide and 15.5 mg/L WAD cyanide. The biomass consisted of a mixed culture of species of Pseudomonas acclimated to elevated cyanide concentrations.

Analysis of the heap leach pad drainwaters to be treated is presented in Table 1. Approximately 5400 gallons of this wastewater was transported to and stored at the treatment site. Wastewater to be treated was maintained at 60.5°+/−3.0° F. during the testing period.

The treatment performance test design began with dilution of the wastewater with a make-up water similar in chemical composition, but containing only trace concentrations of cyanide and thiocyanate. The total cyanide and cyanate concentrations of the wastewater to be tested were increased to 50% of the total influent flow over the test period. Hydraulic loading rates were maintained at 0.5 to 1.5 g/day/ft$^2$. Experience indicates that hydraulic loading rates of 5.0 g/day/ft$^2$ are achievable. Results of the 2.0 M RBC test program are presented in Table 3.

TABLE 3
SUMMARY OF TREATMENT PERFORMANCE FOR 2.0 M RBC

|  | Influent Concentrations mg/L | | | Effluent Concentrations mg/L | | | % Removal |
|---|---|---|---|---|---|---|---|
|  | Min | Max | Avg | Min | Max | Avg | Avg |
| Thiocyanate | 1.0 | 29.0 | 6.5 | <0.5 | 9.0 | 2.1 | 68 |
| Total Cyanide | 4.61 | 62.45 | 15.4 | 0.10 | 3.0 | 1.44 | 91 |
| WAD Cyanide* | 3.43 | 54.20 | 12.45 | 0.02 | 2.20 | 0.59 | 95 |
| Copper | 0.44 | 6.46 | 1.95 | 0.21 | 4.37 | 1.24 | 37 |
| Ammonia | 6.18 | 23.6 | 13.12 | 0.74 | 21.20 | 9.46 | 28 |

*WAD Cyanide is analyzed as Weak Acid Dissociable Cyanide. measured according to ASTM standards.

The test procedure was designed to optimize removal of cyanides and thiocyanate. Prior testing has determined that ammonia, copper, and other heavy metals can be removed with greater efficiency by adding surface area (media) in a staged filter or additional RBC's.

Removal of total cyanide and WAD cyanide was greater than 95% at peak loading rates. Average removal of total cyanide and WAD cyanide was 91% and 95% respectively. The influent pH was maintained at approximately 9.0 and the effluent pH averaged 8.2. This pH depression is caused by intermediate products of degradation such as SO$_3$ formed during thiocyanate degradation. Hydraulic loading rates of 1.0–5.0 g/d/ft$^2$ are proposed for the wastewater tested. A hydraulic retention time of 0.75 to 1.0 hours is adequate for treatment.

The foregoing invention has been described by test results from several physical systems to promote a singular process. Mixed cultures of Pseudomonas species acclimated to cyanide are used in the processes. It is obvious that the process has broadened applications subject to modifications to fit specific sites within the scope of the appended claims.

What is claimed is:

1. A method for detoxification of highly alkaline aqueous wastes having a cyanide concentration of at least about 25 mg/ml, comprising:
   contacting said aqueous wastes with at least one Pseudomonas strain adapted for:
   a) tolerance to at least 45 mg/liter cyanide containing compounds:
   b) tolerance to a pH in excess of about 9.5; and
   (c) capacity to biologically detoxify or degrade cyanide containing compounds;
   for a sufficient period of time so as to lower said cyanide levels to less than about 1 mg/liter in effluent water.

2. A method of claim 1, wherein said cyanide-containing aqueous waste water further includes at least one compound selected from the group consisting of metal complexed cyanides and thiocyanides.

3. A method of claim 1, wherein said contacting occurs in a heap leach pad.

4. A method of claim 1, wherein said microorganisms convert said cyanide containing compounds into carbonates, sulfates, nitrates, and absorbed heavy metals.

5. A method of claim 1, wherein said microorganisms comprise at least one strain which lowers the pH of said waters.

6. A method of claim 1, wherein said sufficient period of time is at least about one hour.

7. A method of claim 1, wherein said contacting is performed in a biological contacting system selected from the group consisting of a rotating biological contactor, a trickling filter, and a bio-tower design.

8. A method of claim 6, wherein said method has a mass load rate capacity of at least about 5 pounds/day/ft$^2$.

* * * * *